Nov. 3, 1959 G. H. FATHAUER 2,911,562

TELEVISION CAMERA CIRCUITS

Filed Sept. 20, 1957

Inventor
George H. Fathauer
by Hill, Sherman, Meroni, Gross & Simpson Attys 2,911,562

TELEVISION CAMERA CIRCUITS

George H. Fathauer, Decatur, Ill., assignor to Thompson Ramo Wooldridge Inc., a corporation of Ohio Application September 20, 1957, Serial No. 685,252

6 Claims. (Cl. 315—10)

Figure 1:
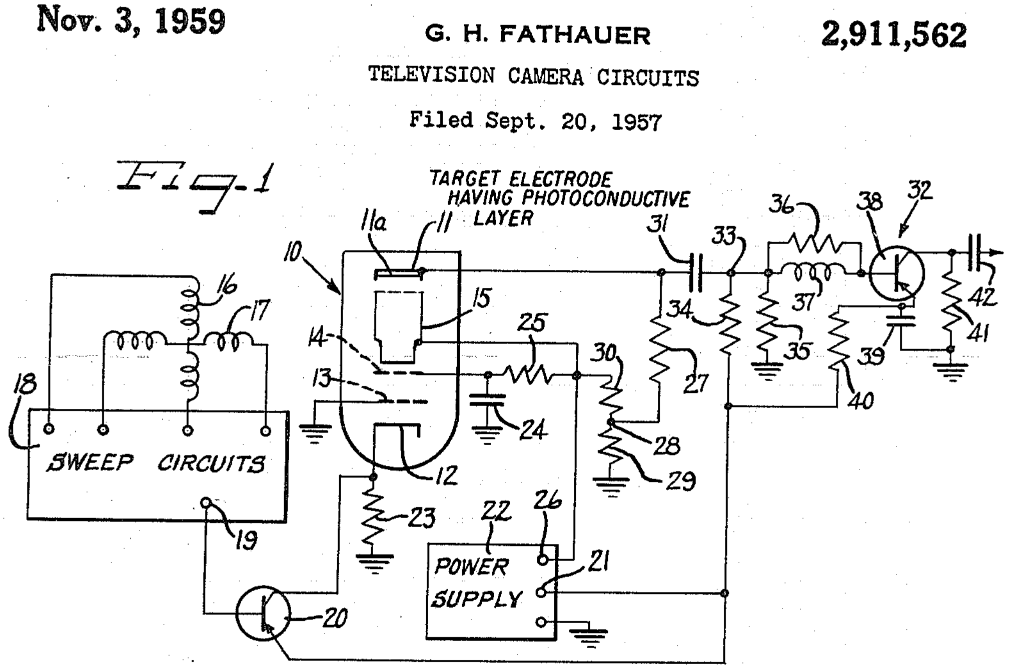

This invention relates to a television camera circuit and more particularly to a circuit for a photo conductive type of camera tube. Such a tube usually comprises a signal electrode, a layer of photoconductive material on the signal electrode, an electron-emitting cathode and means including an accelerating electrode maintained at a positive potential relative to the cathode for inducing flow of electrons in a beam to the photoconductive layer. Suitable deflection means, usually magnetic, are provided for causing the electron beam to scan the photoconductive layer. In the operation of such a tube, an image is focused on the photoconductive layer and the beam is caused to scan the layer. At any instant, the electron current flow from the beam to the signal electrode will be proportional to the light integrated since the last scan on the point at which the beam is at that instant focused. There is thus produced a video signal which is applied to the input of a video amplifier.

It is essential that proper operating potentials be applied to the elements of such a tube and with supply circuits of the prior art, the adjustment of the circuits has been a very troublesome problem.

In the usual adjustment procedure, for example, the voltage of a control grid between the cathode and the accelerating electrode is set at a maximum value and with the iris of the camera lens closed, certain fixed potentials are applied to the other elements of the tube. After checking the deflection circuits to make such that they are operating, the signal electrode voltage is set at a certain relatively low value. The iris is then partially opened, and the control grid voltage is then decreased until a picture appears on a monitor connected to the camera. After adjusting the focusing electrode, the lens focus and the scanning system, the iris is opened and/or the signal electrode voltage is increased to an extent necessary to give a bright picture of the monitor. The control grid voltage is then readjusted to obtain the best resolution. Frequently, it is necessary to perform several readjustments of the signal electrode voltage and the control grid voltage.

After so adjusting the system, the illumination may change and it has been necessary to readjust the iris opening and/or the signal electrode voltage, and it may be necessary to further readjust the control grid voltage.

It will be appreciated that such an adjustment procedure not only requires a very skillful operator but is time consuming. In addition, improper adjustment may result in damage to the tube which is a very expensive component.

I have heretofore developed a circuit using a control tube to maintain the signal electrode current at a constant value, preferably in a special circuit in which the control tube also functions as a first tube of the video amplifier. Maintaining the signal electrode current at a constant value greatly reduces the amount of adjustment necessary with changes in lighting conditions. However, it is still found necessary to make adjustments, particularly at extremely high and low illumination levels, in order to obtain optimum operation.

This invention was evolved with the object of providing an inexpensive, reliable camera tube circuit in which the necessity for adjustments with variations in operating conditions is eliminated so far as possible.

According to this invention, the current supply circuit for the signal electrode incorporates a series resistance having an extremely high value. Such a resistance tends to reduce the variations in the signal electrode current, to thus achieve the advantages of my prior circuit discussed above. In addition, the circuit is very reliable in operation and comparatively inexpensive, although it is necessary to use special resistance elements and special care in construction to obtain the high resistance as will be discussed hereinafter.

A further feature of the invention is in a special design of the current supply such that the signal electrode current is not maintained absolutely constant but is varied to automatically obtain optimum performance characteristics under all illumination conditions.

Another important feature of the invention is in an improved current supply circuit for the accelerating grid or electrode of the camera tube. It is found that by maintaining the accelerating electrode current substantially constant, the operation of the camera tube is stabilized and optimum performance is obtained despite variations in operating conditions. According to this feature, the accelerating electrode current is maintained substantially constant through the use of a series resistance having a high value in relation to the effective resistance between the accelerating electrode and the cathode. The provision of such a resistance is very simple and inexpensive, and the circuit is completely reliable.

Still another feature is in the operation of the accelerating electrode at a comparatively low voltage. With this feature, the bias voltage required to be supplied to the control grid is greatly reduced to simplify the design of the bias supply and to also reduce the voltage change required for blanking. This feature has the further advantage that it permits the use of a high series resistance with a current supply having a comparatively low power output.

This invention thus provides a camera tube circuit which is simple, inexpensive and reliable in operation and which automatically adjusts itself to variations in lighting and other operating conditions so as to eliminate the need for manual adjustment and so as to permit use by unskilled operators.

Figure 2:
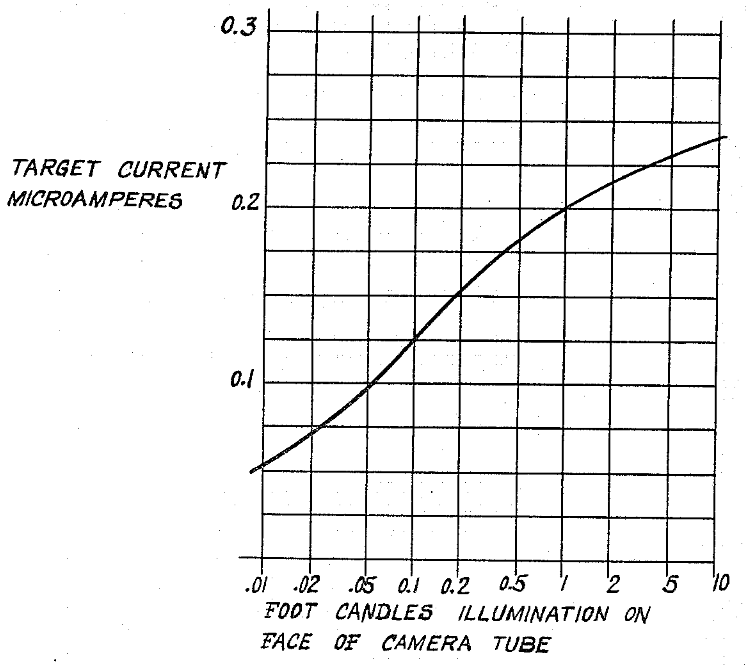

This invention contemplates other and more specific objects, features and advantages which will become more fully apparent from the following detailed description taken in conjunction with the accompanying drawings which illustrate a preferred embodiment and in which:

Figure 1 is a schematic diagram of a preferred form of television camera tube circuit constructed according to the principles of this invention; and Figure 2 is a graph illustrating the optimum relation between signal electrode current and illumination.

Reference numeral 10 designates a television camera tube of the photoconductive type. The tube 10 comprises a signal electrode or targe 11 on which a thin layer of photo-conductive material 11a is deposited as diagrammatically illustrated; an electron-emitting cathode 12; a control grid or electrode 13; an accelerating grid or electrode 14; a focusing grid or electrode 15; and a pair of deflection coils 16 and 17. The tube 10 also includes a focusing field, not shown.

In operation, an image is focused on the photo-conductive layer 11a of the target 11 and an electron beam produced by elements 12—15 is caused to scan the target 11 by applying suitable sweep currents to the deflection coils 16 and 17. At any instant, the electron current flow from the beam to the signal electrode or target 11 will be proportional to the light intensity of the point in which the beam is at that instant focused, and there is thus produced a video signal at the target 11.

The deflection coils 16 and 17 are connected to sweep circuits 15 which may be of conventional form and are hence shown diagrammatically in block form. The sweep circuits 18 are arranged to develop blanking signals at a terminal 19 connected to the base of a transistor 20. The emitter of the transistor 20 is connected to a terminal 21 of the power supply 22 shown diagrammatically in block form. The terminal 21 may, for example, be at a positive potential of 6 volts.

The collector of the transistor 20 is connected to the cathode 12 and also through a load resistor 23 to ground. In operation, the cathode 12 is normally at ground potential, but a positive potential is applied thereto when blanking signals are developed at the terminal 19, to thus cut-off the electron beam during retrace.

The grid 13 is connected to ground, but it will be apparent that it would also be possible to connect the cathode directly to ground and apply a negative blanking signal to the grid 13.

The accelerating grid or electrode 14 is connected through a by-pass capacitor 24 to ground and also through a resistor 25 to a terminal 26 of a power supply which may be at a relatively high potential with respect to ground, for example 250 volts. The focusing grid 15 is connected to the terminal 26. It may here be noted that it is usually desirable to provide for a certain degree of adjustment of the potential of the terminal 26 to adjust the focus.

The signal electrode or target 11 is connected through a resistor 27 to a circuit point 28 which is connected through a resistor 29 to ground and to a resistor 30 to the power supply terminal 26, the resistors 29 and 30 thus forming a voltage divider net work.

The target 11 is also connected through a coupling capacitor 31 to the input of an amplifier stage generally indicated by reference numeral 32. In particular, the target is coupled through the capacitor 31 to a circuit point 33 which is connected through a resistor 34 to the power supply terminal 21, through a resistor 35 to ground and through the parallel combination of a resistor 36 and inductance coil 37 to the base terminal of a transistor 38. The emitter of the transistor 38 is connected through a by-pass capacitor 39 to ground and through a resistor 40 to the power supply terminal 21. The collector of the transistor 38 is connected through a load resistor 41 to ground and through a coupling capacitor 42 to the input of a succeeding amplifier stage.

According to this invention, the effective value of the resistance in series with the target 11 is extremely high. In particular, the effective series resistance is much greater than the minimum value of the effective resistance between the target 11 and the cathode 12. With a standard type of photoconductive camera tube such as the RCA Vidicon type 6198, the series resistance should be at least 100 megohms and the effective or no-load voltage of the source should be at least 100 volts. By using such an extremely high resistance, changes in target current due to changes in illumination or other variables will be minimized.

It would appear to be desirable to maintain target current as constant as possible and it would thus appear to be desirable to make the series resistance as high as possible. It has been discovered, however, that maintaining the target current absolutely constant does not produce optimum performance, particularly at the lowest and highest levels of illumination and it has been further discovered that by using a source having a certain effective resistance and a certain effective voltage, optimum performance is obtained under all lighting conditions. It should be noted that the target current is to be understood to be the current flowing in the conductor between target 11 and the junction between resistor 27 and capacitor 31.

Figure 2 is a graph illustrating how the optimum target current varies with changes in illumination for an RCA Vidicon type 6198 operated with a 250 volt on the focusing electrode and with the relative values of the control grid and accelerating grid voltages adjusted to obtain best resolutions. It will be observed that the optimum current increases as the illumination level increases. At low illumination levels, the current should be at a value such as to provide a balance between flare and noise. Flare is a non-uniformity in the dark current background of the picture which increases with increases in the target potential. Noise refers, of course, to random, spurious signals inherently produced in electronic devices. The ratio of noise to signal output is decreased as the target current is increased. Both flare and noise are considerations at low illumination levels and since an increase in target current increases one while reducing the other, it is necessary to obtain a balance therebetween at low illumination levels. As the illumination level is increased, the flare factor is decreased and the target current can be increased to obtain a higher signal to noise ratio. Thus an upwardly sloping curve as illustrated in Figure 2 results. This curve can of course be obtained by connecting the target through a microammeter to a variable voltage source, and by adjusting the voltage of the source to obtain optimum operation at the various illumination levels while noting the target current at each illumination level.

It has been found that an optimum target current such as illustrated graphically in Figure 2 can be automatically obtained with a target current supply having a certain effective voltage and a certain effective resistance, and that the required voltage and resistance can be calculated after making preliminary measurements such as required to plot the graph.

In particular, the relation between target current, target voltage and illumination for a photoconductive type camera tube is approximated by the following expression:

$$i=KEL^n \quad \text{(A)}$$

where E is the target voltage, L is the illumination on the face of the camera, and K and $n$ are constants dependent upon the camera tube.

If the target is connected to a current source having an effective or no-load voltage $Eo$ and an effective resistance R, the target voltage is given by the following expression:

$$E=Eo-Ri \quad \text{(B)}$$

Combining (A) and (B), $$i=\frac{EoKL^n}{1+KL^nR} \quad \text{(C)}$$

If it is assumed that equation C will be satisfied at two different illumination levels $L_1$ and $L_2$ at which target currents I, $I_2$, respectively flow, Formula C can be solved to derive the following formulas for $Eo$ and R:

$$Eo=\frac{I_1I_2(L_2^n-L_1^n)}{KL_1^nL_2^n(I_2-I_2)} \quad \text{(D)}$$

$$R=\frac{I_1L_2^n-I_2I_1^n}{KL_1^nL_2^n(I_2-I_1)} \quad \text{(E)}$$

For maximum accuracy of calculation, $L_1$ and $L_2$ are preferably taken at the limits of the desired range of operation. That is $L_1$ should preferably be the minimum level and $L_2$ the maximul level. For example, the graph of Figure 2 shows a current of 0.05 microampere at a minimum illumination level of 0.01 foot-candle and a current of 0.235 microampere at an illumination level of 10 foot candles. With an RCA Vidicon type 6198, $n$ equals about 0.6 while K is equal to about $8\times10^{-9}$. Substituting these values in Equations D and E, it will be found that Eo should equal 125 volts, while R should equal 500 megohms.

In the illustrated circuit, the resistor 27 has a resistance of 500 megohms and the resistors 29 and 30 each have a resistance of 22 megohms. The power supply has a negligible internal impedance, so that the effective resistance in series with the target is approximately 511 megohms. The effective or no-load voltage of the source is 125 volts, assuming 250 volts at the terminal 26. The effective resistance and the effective voltage of any source may, of course, be determined by applying Thevenin's or Pollard's theorem that the current in any impedance connected to two terminals of a network is the same as if the impedance were connected to a simple generator whose generated voltage is the open-circuited voltage at the terminals in question and whose impedance is the impedance of the network looking back from the terminals, with all generators replaced by impedances equal to the internal impedances of such generators.

Using values such as described above, it is found that the target current closely approximates the graph of Figure 2 with variations in illumination level.

It should be noted that although optimum performance is attained with values calculated from the above formulas, the values can be varied to some degree without seriously hampering performance. In general, it can be stated that the series resistance should be from 100 to 1000 megohms and the effective voltage should be at least 100 volts.

A further important feature of the invention is that the resistor 25 in series with the accelerating grid 14 has a very high value, much larger than the effective resistance between the accelerating grid and the cathode. For example, the resistor 25 preferably has a resistance of 1.5 megohms, compared to an effective resistance of the accelerating grid relative to the cathode of about 0.35 megohm. By using such a high resistance, highly advantageous results are obtained. In particular, the use of the high resistance tends to maintain the accelerating grid current substantially constant which in itself would not be important, but it has been found that there is a substantially fixed relation between the accelerating grid current and the beam current and it is highly desirable that the beam current be maintained constant. If the beam does not have sufficient intensity, the picture highlights will all have the same brightness and show no detail and in addition the highlights will tend to "stick." The loss of detail and sticking of the highlights is generally referred to as "bloom." However, if the beam has excessively high intensity, the size of the scanning spot is increased with a resultant decrease in resolution. Heretofore, it has been the practice to provide a means for manually adjusting the potential of the control grid to control beam intensity. In the hands of an unskilled operator, this has resulted in either "bloom" or loss of resolution. Further, even with skilled operators it has been necessary to adjust the control grid voltage with variations in operating conditions. By maintaining the accelerating grid current constant and thus maintaining the beam current constant, it has been found that the need for adjustment of the control grid voltage is eliminated, and optimum beam intensity is automatically maintained.

Another feature of the invention is that the accelerating grid is operated at a comparatively low voltage. It has heretofore been the practice to operate the accelerating grid at a voltage approximately the same as the voltage applied to the focusing electrode, usually on the order of 200 to 300 volts. It has been discovered that such a high voltage is not only not necessary but that important results are obtained by reducing the voltage. In particular, it has heretofore been necessary to apply a negative voltage of from 45 to 100 volts to the control grid to obtain picture cutoff and it has also been necessary to operate the grid at a relatively high negative voltage in normal operation. By reducing the accelerating grid voltage, however, it has been found possible to operate the control grid at cathode potential in normal operation, to thus eliminate the need for any bias arrangement. In addition, it has been found that by applying a relative low voltage to the control grid, the picture can be cut off. Thus in the illustrated circuit, the picture can be cut off. Thus in the illustrated circuit, the picture can be cut-off by means of the transistor 20 operated from a six volt source.

Operation of the accelerating grid at a low voltage has the further advantage that it permits the use of a series resistance which is high as compared to the accelerating grid-cathode resistance but without requiring an excessively high applied voltage. Thus in the illustrated circuit, the accelerating grid is operated at a voltage in the neighborhood of 40 to 50 volts, the resistor 25 has a resistance of about 1.5 megohms, and yet only a 250 volt supply is required.

It should be noted that because of the extremely high value of the resistor 27, considerable care must be exercised in the actual physical construction of the circuit. Care should be taken to obtain a resistor having a stable resistance which is not effected by atmospheric moisture conditions. It is essential that the capacitor 31 have a leakage resistance which is much higher than the resistance of resistor 27. It will be appreciated that a much lower leakage resistance would be tolerable in most other applications. It will ordinarily be desirable to support the junction between the leads of target 11, capacitor 31 and resistor 27 on a terminal post, and care must be taken that the terminal post have an extremely high leakage resistance. Care must also be taken in assembling and handling of the parts to make sure that one does not inadvertently create a leakage path having a resistance comparable to that of the resistor 27.

It will be understood that modifications and variations may be effected without departing from the spirit and scope of the novel concepts of this invention.

I claim as my invention:

1. In a television camera system, a camera tube including a signal electrode, a photoconductive layer on said electrode, an electron-emitting cathode, and means for producing a flow of electrons in a beam from said cathode to said photoconductive layer, the effective resistance between said signal electrode and said cathode being subject to variations due to variations in illumination of said photoconductive layer, and a current supply circuit for said signal electrode including a series resistance having an effective value on the order of from 100 to 1000 megohms.

2. In a television camera system, a camera tube including a signal electrode, a photoconductive layer on said electrode, an electron-emitting cathode, and means for producing a flow of electrons in a beam from said cathode to said photoconductive layer, the effective resistance between said signal electrode and said cathode being subject to variations due to variations in the illumination of said photoconductive layer, and a current supply circuit for said signal electrode having an effective no-load voltage of at least 100 volts and having an effective internal resistance of from 100 to 1000 megohms.

3. In a television camera system, a camera tube including a signal electrode, a photoconductive layer on said electrode, an electron-emitting cathode, and means for producing a flow of electrons in a beam from said cathode to said photoconductive layer, the effective resistance between said signal electrode and said cathode being subject to variations due to variations in the illumination of said photoconductive layer, and a current supply circuit for said signal electrode having an effective no-load voltage of at least 100 volts and having an effective internal resistance on the order of at least 100 megohms.

4. In a television camera system, a camera tube including a signal electrode, a photoconductive layer on said electrode, an electron-emitting cathode, and means for producing a flow of electrons in a beam from said cathode to said photoconductive layer, the effective resistance between said signal electrode and caid cathode being subject to variations due to variations in the illumination of said photoconductive layer, the optimum current flow to said signal electrode being defined by the formula $$KEL^n$$

where E is the signal electrode voltage, L is the illumination on the signal electrode and K and $n$ are constants dependent upon the camera tube, and a current supply for said signal electrode having an effective no-load voltage substantially equal to $$\frac{I_1I_2(L_2^n-L_1^n)}{KL_1^nL_2^n(I_2-I_1)}$$

and an effective internal resistance substantially equal to $$\frac{I_1L_2^n-I_2L_1^n}{KL_1^nL_2^n(I_2-I_1)}$$

where $I_1$ and $I_2$ are the optimum values of signal electrode current at illumination levels $L_1$ and $L_2$, respectively.

5. In a television camera system, a camera tube including a signal electrode, a photoconductive layer on said signal electrode, an electron-emitting cathode, and means including an accelerator electrode operated at a positive potential relative to said cathode to induce flow of electrons in a beam to said photoconductive layer, the effective resistance between said signal electrode and said cathode and the effective resistance between said accelerator electrode and said cathode being subject to variations due to variations in operating conditions, a current supply circuit for said signal electrode having an effective no-load voltage of at least 100 volts and having an effective internal resistance on the order of at least 100 megohms, and a current supply circuit for said accelerator electrode having an effective value substantially higher than the minimum value of the effective resistance between said accelerating electrode and said cathode.

6. In a television camera system, a camera tube including a signal electrode, a photoconductive layer on said signal electrode, an electron-emitting cathode, and means including an accelerator electrode operated at a positive potential relative to said cathode to induce flow of electrons in a beam to said photoconductive layer, the effective resistance between said signal electrode and said cathode and the effective resistance between said accelerator electrode and said cathode being subject to variations due to variations in operating conditions, the optimum current flow to said signal electrode being defined by the formula $$KEL^n$$

where E is the signal electrode voltage, L is the illumination on the signal electrode, and K and $n$ are constants dependent upon the camera tube, a current supply circuit for said signal electrode having an effective no-load voltage substantially equal to $$\frac{I_1I_2(L_2^n-L_1^n)}{KL_1^nL_2^n(I_2-I_1)}$$

and an effective internal resistance substantially equal to $$\frac{I_1L_2^n-I_2L_1^n}{KL_1^nL_2^n(I_2-I_1)}$$

where $I_1$ and $I_2$ are the optimum values of signal electrode current at illumination levels $L_1$ and $L_2$, respectively, and a current supply circuit for said accelerator electrode having an effective value substantially higher than the minimum value of the effective resistance between said accelerator electrode and said cathode.

References Cited in the file of this patent

UNITED STATES PATENTS

| | | |
|---|---|---|
| 2,084,700 | Ogloblinsky | June 22, 1937 |
| 2,544,753 | Graham | Mar. 13, 1951 |
| 2,555,091 | Lubszynski | May 29, 1951 |
| 2,654,853 | Weimer | Oct. 6, 1953 |
| 2,786,960 | Palmer | Mar. 26, 1957 |
| 2,810,087 | Forgue | Oct. 15, 1957 |